United States Patent Office 3,108,133
Patented Oct. 22, 1963

3,108,133
PURIFICATION OF TRIACETIN
Lloyd W. Trevoy and Derek Tegg, Edmonton, Alberta, Canada, assignors to Canadian Chemical Company Limited, Edmonton, Alberta, Canada, a corporation of Alberta, Canada
No Drawing. Filed Jan. 22, 1960, Ser. No. 3,980
16 Claims. (Cl. 260—499)

This invention relates to a method of purifying crude esters. More particularly, this invention deals with the purification of glyceryl triacetate (triacetin).

Triacetin is generally prepared by esterifying glycerol with an acetic acid or acetic anhydride. If crude glycerol (obtained as a by-product of soap manufacture) is used, it will contain as impurities sodium sulphate and caustic, so that the crude ester product will contain sodium sulphate, sodium acetate, as well as other impurities which may have been present in the crude glycerol. In addition, colored impurities may be present in the glycerol or may be formed during the esterification of the glycerol. (Some color may be generated even when purified glycerol is used.) In addition, since an excess of acid or acid anhydride is generally used in esterifying, the crude ester contains free acid.

Triacetin is used as a plasticizer for cellulose acetate. For some purposes, as when this plasticizer is employed in the manufacture of cigarette filter tips from cellulose acetate, the triacetin must be of exceptionally high purity.

A number of prior art methods are known for attempting to reduce the acidity of triacetin. One such method includes taking up triacetin in ether or benzene and washing it free of acetic acid with water or aqueous alkali. This method is cumbersome on a commercial scale and is also inefficient because of the solubility of the triacetin itself in water. Another method introduces concentrated sodium hydroxide solution after the bulk of the acetic acid has been removed by distillation but prior to the distillation of the triacetin. This method reduces the content of the acetic acid in the triacetin somewhat, but is incapable of reducing the acidity to the desired level, e.g. below 0.005%.

We have also attempted to reduce the acidity by fractionally distilling the triacetin at reduced pressure using an efficient fractionating column. However, after distillation the product still contains an appreciable amount e.g. from 0.03 to 0.08%, of acetic acid. This residual acidity after distillation is due, we believe, to the formation of acetic acid by the slow decomposition of triacetin, at the temperature of distillation.

In addition to the requirement that glyceryl esters such as triacetin be of extremely low acidity, it is also desirable that the color rating be below 10 (APHA), that the final water content be below 0.15%, that the ester content be a minimum of 99%, and that the ester be odorless.

Accordingly, it is an object of our invention to provide a method for purifying triacetin.

Another object is to provide a method for purifying a crude mixture containing triacetin as its major constituent.

A further object is to provide a method of producing triacetin of the highest purity, notwithstanding the fact that the crude ester before purification may have high acidity, a high odor level, and a high color.

Additional objects will become apparent hereinafter.

In accordance with one aspect of our invention, the crude triacetin is given a preliminary distillation, leaving behind, as residue, colored impurities, inorganc salts, and other non-volatiles. The distillate is then subjected to distillation in the presence of water to take off water and acetic acid overhead. The heavy ends from this distillation are then distilled to remove a light end fraction high in water content. The remainder constitutes the purified glyceryl ester product.

More specifically, a reaction mixture made by reaction of glycerol and excess acetic acid or anhydride, may be distilled to take off first the major part of the acetic acid. This distillation is most conveniently a flash distillation conducted first at atmospheric pressure and, in its later stages, at subatmospheric pressures, e.g. pressures of about 30 to 100 mm. Hg absolute. The residue, which may contain, for example, about 0.5 to 2% of acetic acid (based on its triacetin content) may then be given the aforesaid preliminary distillation to separate it from the colored impurities formed during the reaction, as well as from the nonvolatile contaminants (sodium sulfate, sodium acetate and other impurities) which are present when crude glycerol derived from soap-making is one of the reactants. The distillation may be effected conveniently at top temperatures in the range of about 160 to 185° C. using pressures in the range of about 25 to 75 mm. Hg A. We have found that this separation is effected most advantageously, cleanly, without appreciable loss of triacetin, by simple flash distillation.

The distillate from the preliminary distillation will generally have a boiling range of about 130 to 172° C., preferably about 168 to 172° C., at a pressure of 48–50 mm. Hg A, an acid content (calculated as acetic acid) in the range of about 0.1 to 3%, preferably about 0.1 to 1%. This partly purified product will be practically colorless, e.g. its color may be less than 10 (APHA), preferably less than 5 (APHA).

When purified synthetic glycerol is used for the reaction, the aforementioned step of "preliminary distillation" may often be omitted, and the reaction mixture may be subjected to the distillation with water directly after the step of distilling off most of the acetic acid.

The distillation of the partly purified material in the presence of water has the effect not only of reducing the acidity of the triacetin but also of removing the odor. Presumably the odor-forming impurities are distilled off with the water-acetic acid distillate. It is desirable to continue this distillation until the acid content of the residue is less than about 0.005% (based on the weight of triacetin), preferably below 0.002%. At times the amount of odor-forming impurity is so great that the product has some odor even after its acid content has been reduced to the desired level. In that case the distillation with water may be continued until the disagreeable odor is substantially removed.

The distillation of the triacetin with water may be conducted at atmospheric pressure. However, we prefer to carry it out at reduced pressure for then there is the added advantage of maintaining a lower temperature, with the result that there is much less possibility that any colored impurities will be generated as a result of slow break-down of triacetin. The temperature of the liquid during the distillation with water is suitably in the range of about 40 to 100° C.

We have found that the distillation with water is carried out more efficiently when the water content of the mixture being distilled is low and the water is added continuously or continually to the mixture to make up for the amount of water take up overhead. Even though a relatively large total amount of water may be employed, for example in the range of about 1 to 4 parts by weight of water per part of triacetin, it is desirable to maintain the instantaneous water content of the mixture being distilled within the relatively low range of about 0.1 to 5% (based on the weight of the triacetin) during the distillation. It is highly advantageous to add the water continuously in the form of steam, e.g. as superheated steam. In this way we increase the rate of removal of the volatile impurities, decrease the time necessary for the treatment and reduce the danger of a buildup of color in the product.

As regards the final distillation of the triacetin (bottoms from the distillation with water) we find it desirable to distill off from about 5 to 15% of the triacetin, thereby leaving a residue of pure triacetin. We have found that the "forerun" fraction that is removed is high in water content and also contains a higher proportion of any odor bearing impurities (volatiles that may not have been removed), than the residue. We have found that the removal of the forerun, which contains the bulk of the residual water, results in the obtaining of a pure triacetin residue having a water content of less than 0.15% (e.g. 0.05%). For the final fractional distillation a base temperature in the range of about 150 to 230° C., preferably about 170 to 180° C. at subatmospheric pressure is most suitable. If an extremely low water content is not required, the water may be removed by distillation at these temperatures, without taking off any appreciable forerun of triacetin; for example, we can attain a water content of 0.11% by heating at 160° C. at 50 mm. Hg A.

Because our purifying process is carried out under mild conditions (absence of caustic, etc.) no appreciable hydrolysis of the glyceryl ester occurs, so that there is no appreciable drop in ester value. Thus, if the ester value of the triacetin is approximately 99.5% before our purification process, the ester value after purification is not appreciably lowered.

Our purification method is applicable even when the initial crude glyceryl ester contains a very high level of esterifying acid, has a high color, and has a high odor level. Of course, under such circumstances it may be necessary to prolong the distillation with water. And, as a result of such prolonged treatment the color of the final glyceryl ester residue (after distilling off the forerun), may build up to a level higher than desired, e.g. higher than 10 (APHA). In that event, the flash distillation may be repeated to remove the color. If after the repeating of the flash distillation the acidity is too high, both the distillation treatment with water and the subsequent distillation to remove the "forerun" may be repeated to again reduce the acid and water content of the purified glyceryl ester product.

Our invention can be applied to the purification of a crude glyceryl ester prepared from either synthetic glycerol, purified glycerol, or crude glycerol. It will be understood that the duration of any one of our process steps can be varied to meet the particular problem presented. For example, in purifying crude triacetin prepared from crude glycerol it is desirable to extend the duration of the hot water or steam stripping operation because of the slower rate of removal of odor-bearing impurities as compared to the rate of removal of acetic acid.

The following examples will further illustrate our invention. All parts are by weight unless otherwise indicated.

*Example I*

A crude batch of triacetin was prepared by reacting 478 parts of crude glycerol (86% pure) (obtained in the manufacture of soap and having a water content of 3.75%) with 1764 parts acetic anhydride. The reaction was carried out at 133° C. The crude product was distilled at atmospheric pressure to thereby distill off 940 parts of acetic acid of 114° C. boiling point (measured at 710 mm. Hg A). The residue consisting of crude triacetin and had an acetic acid content of 16%.

*Example II*

One hundred milliliters of the crude triacetin of Example I (acidity, 16%) were flash distilled at 48 mm. Hg A to yield 98 ml. of colorless product as the distillate. To this distillate six hundred milliliters of distilled water were continuously added dropwise and were simultaneously continuously removed by distillation at a pressure of 50 mm. Hg absolute and at a liquid temperature of about 40–60° C. over a period of 5 hours. This reduced the acidity of the triacetin to 0.244%. Three 95 ml. aliquots of water were successively introduced and distilled off over a period of two hours, at 50–70° C. and 50 mm. Hg A, thereby further reducing the acidity to 0.0024%. In this procedure, almost all the water from one aliquot was distilled off before adding the next. A 7 ml. forerun was distilled off at reduced pressure (50 mm. Hg A) and at a temperature of about 172° C. The forerun had a slight odor. The remaining triacetin was odorless, had an acid content of 0.0015%, and was pale yellow in color.

*Example III*

Triacetin was produced by reaction of glycerine and excess acetic anhydride, without a catalyst at 120–135° C. Most of the acetic acid was removed by first distilling at atmospheric pressure until the vapor temperature reached 128° C., followed by distillation at 52° C. and 30 mm. Hg A in a fractionating column. Thereafter the triacetin was flash distilled at 163° C. and 30 mm. Hg A, taking 97% of the material overhead.

Five hundred milliliters of the resulting partially purified triacetin having an acid content of 0.70% were purified by distillation with superheated steam under reduced pressure. The pressure was maintained at 50 mm. and the superheated steam at 90 to 95° C. was passed through the triacetin, which was maintained at a temperature of 60° C. The temperature of the steam leaving the still was about 45° C. The reduction in acidity of the crude triacetin is shown is shown by the following data:

| Acidity of crude triacetin (percent) | Weight of water passed through triacetin as steam (gm.) | Time (hour) |
|---|---|---|
| 0.707 | 0 | 0 |
| 0.488 | 80 | 0.66 |
| 0.098 | 320 | 3.26 |
| 0.032 | 500 | 4.66 |
| 0.004 | 750 | 6.26 |
| 0.0015 | 1000 | 7.92 |

*Example IV*

A crude reaction mixture containing triacetin prepared by substantially complete reaction of glycerol and 10% excess acetic anhydride was distilled at atmospheric pressure to reduce the acetic acid content of the residue to 16%. The residue was then distilled at a pressure of 50 mm. Hg absolute, with the temperature rising to 130° C., until the acetic acid content of the residue was 0.16%. The residue was then flash distilled at a pressure of 50 mm. Hg absolute and a temperature rising to 172° C. to take off 98–99% of the last mentioned residue overhead. The resulting liquid distillate was maintained at a temperature of 60° C. and a pressure of 50 mm. Hg absolute while superheated steam (at an initial temperature of 60° C.) was passed through it and vapors of water and acetic acid were taken off overhead, until the acetic acid content of the bottoms was 0.002% or until the bottoms were essentially free of odor. The bottoms were then distilled at a pressure of 50 mm. Hg absolute with the temperature rising to 172° C. while a forerun of 10% of said bottoms was taken overhead. The residue was substantially colorless and odorless triacetin of 99.6% purity.

As noted earlier, if, after the step of water codistillation or steam distillation, the color is not acceptable, a second flash distillation, water or steam distillation, and distillation off of the glyceryl ester forerun may be carried out to thereby render the purified glycerol ester colorless.

We have described our invention more particularly with respect to the purification of crude triacetin. It will be understood, however, that the invention also finds application in the purification of other glyceryl esters, e.g. esters of glycerol and such acids (or anhydrides thereof) as propionic, butyric, acrylic, crotonic; mixed esters of such acids; partial esters, e.g. diacetin; also other polyhydric alcohol esters, e.g. ethylene glycol diesters of acetic, propionic or butyric acid.

It will therefore be understood that the foregoing detailed description is merely given by way of illustration and that many variations may be made therein without departing from the spirit of our invention.

Having described our invention, what we desire to secure by Letters Patent is:

1. A process for purifying crude triacetin containing acetic acid comprising distilling the crude triacetin to thereby remove as residue non-volatile impurities therefrom, adding water to the ester distillate and distilling off said water to reduce the acidity of said ester, distilling from the bottoms from said last mentioned distillation a water-containing forerun fraction of said ester, and recovering the purified glyceryl ester as the bottoms from said fractional distillation.

2. The method of claim 1 wherein the water is added in the form of steam.

3. The method of claim 1 wherein the water is added in liquid form.

4. In a method of purifying a partially purified crude triacetin containing acetic acid, the step of treating the ester with water and continuously distilling off said water and acetic acid.

5. A process for purifying triacetin containing up to about 3% acetic acid which comprises subjecting said triacetin to distillation in the presence of water to take overhead water and acetic acid and to reduce the acetic acid content of the residue to below about 0.005%.

6. Process as set forth in claim 5 and in which the water is added to said triacetin gradually during said distillation.

7. Process as set forth in claim 5 and in which the water is added to said triacetin gradually during said distillation, while maintaining the concentration of water in the liquid triacetin, during a substantial period of said addition and distillation, in the range of about 0.1 to 5%.

8. In the process of making triacetin by esterification of glycerol with a member of the group consisting of acetic acid and its anhydride to produce a colored crude reaction mixture containing triacetin and acetic acid, the improvement which comprises distilling off a fraction rich in triacetin and of lighter color than said mixture, said fraction having an acetic acid content up to 3% and mixing said fraction with water and distilling off aqueous acetic acid to produce triacetin of lower acetic acid content than said fraction.

9. In the process of making triacetin by esterification of glycerol with a member of the group consisting of acetic acid and its anhydride to produce a colored crude reaction mixture containing triacetin and acetic acid, improvement which comprises distilling off a fraction rich in triacetin and of lighter color than said mixture, said fraction having an acetic acid content of about 0.1 to 1%, mixing said fraction with water and distilling off aqueous acetic acid to produce triacetin containing less than about 0.005% acetic acid, and thereafter distilling off water at subatmospheric pressure.

10. Process as set forth in claim 9 in which the last-mentioned distillation of water comprises a distillation of a fore-run aqueous triacetin in amount of up to about 5 to 15% of the total weight of the triacetin.

11. In a method for purifying partially purified triacetin, the step of treating said partially purified ester with water and continuously distilling off the water.

12. A process for purifying crude triacetin containing a minor amount of acetic acid, which comprises subjecting said crude triacetin to distillation in the presence of water to take overhead water and acetic acid and to reduce the acetic acid content of the residue to below about 0.005%.

13. Process for the removal by distillation of acetic acid present as an impurity in liquid triacetin, which comprises effecting said distillation by heating said liquid triacetin containing acetic acid to a temperature in the range of about 40 to 100° C. while adding water to said triacetin and taking off overhead a distillate of water and acetic acid, the instantaneous water content of the mixture being distilled being less than about 5% and the amount of said water added to the triacetin during said distillation being at least about 1 part per part of triacetin, and continuing said distillation until the acidity of said triacetin has been reduced to less than about 0.005%.

14. Process as set forth in claim 13 in which said distillation with water is effected at subatmospheric pressure.

15. Process for the production of triacetin of low acetic acid content from the products obtained by reaction of glycerol and a member of the group consisting of acetic acid and acetic anhydride, which comprises distilling said products to remove acetic acid and produce a partially purified triacetin containing about 0.1 to 3% of acetic acid and thereafter distilling said partially purified triacetin with water by heating the triacetin to a temperature in the range of about 40 to 100° C. while adding water to said triacetin and taking overhead a distillate of water and acetic acid, the instantaneous water content of the mixture being distilled being less than 5% and the amount of said water added to the triacetin during said distillation with water being at least about 1 part per part of triacetin, and continuing said distillation with water until the acidity of the residual triacetin has been reduced to less than 0.005%.

16. Process as set forth in claim 15 in which the water is supplied to the triacetin in the form of superheated steam at subatmospheric pressure.

References Cited in the file of this patent

UNITED STATES PATENTS

| | | |
|---|---|---|
| 1,937,320 | Franzen et al. | Nov. 28, 1933 |
| 2,426,968 | Grubb et al. | Sept. 2, 1947 |
| 2,594,953 | Marls | Apr. 29, 1952 |
| 2,615,160 | Baur | Oct. 21, 1952 |
| 2,674,609 | Beal et al. | Apr. 6, 1954 |